(No Model.) 3 Sheets—Sheet 1.

M. G. HUBBARD.
CAR TRUCK.

No. 450,156. Patented Apr. 14, 1891.

Attest:
Geo. T. Smallwood.
Jas. K. McCothran

Inventor:
M. G. Hubbard,
By A. M. Smith & Son,
Attorneys.

(No Model.) 3 Sheets—Sheet 2.

M. G. HUBBARD.
CAR TRUCK.

No. 450,156. Patented Apr. 14, 1891.

Attest:
Geo. T. Smallwood.
Jas. K. McLathran

Inventor:
M. G. Hubbard,
By A. H. Smith & Son.
Attorneys.

THE NORRIS PETERS CO., PHOTO-LITHO., WASHINGTON, D. C.

(No Model.)  3 Sheets—Sheet 3.

M. G. HUBBARD.
CAR TRUCK.

No. 450,156. Patented Apr. 14, 1891.

Attest:
Geo. T. Smallwood
Jas. K. McCachran

Inventor:
M. G. Hubbard
By A. L. Smith & Son
Attorneys.

UNITED STATES PATENT OFFICE.

MOSES G. HUBBARD, OF CHICAGO, ILLINOIS.

CAR-TRUCK.

SPECIFICATION forming part of Letters Patent No. 450,156, dated April 14, 1891.

Application filed July 5, 1889. Serial No. 316,516. (No model.)

*To all whom it may concern:*

Be it known that I, MOSES G. HUBBARD, of Chicago, county of Cook, and State of Illinois, have invented a new and useful Improvement in Car-Trucks, of which the following is a full, clear, and exact description, reference being had to the accompanying drawings, making part of this specification.

My invention consists in an improved construction and arrangement of a truck or car gear for mounting street-cars; and it relates, first, to the arrangement of the journal boxes and springs in such manner as to give the car or truck a short wheel-base and a long spring-base to facilitate curving and diminish the rocking of the car.

It further relates to the construction of the wheel-pieces and spring-supports and hanging and working the brakes and to the attachment of the cross-bars for carrying electric motors or cable-grip and to the manner of constructing the skeleton pedestals for holding the journal-boxes and attaching the spring-supports and checking the downward and the upward movement of the springs, and to other details of construction and arrangement to improve the working and the convenience of the truck or gear, as shown in the accompanying drawings, which form a part of this specification, and in which—

Figure 1:
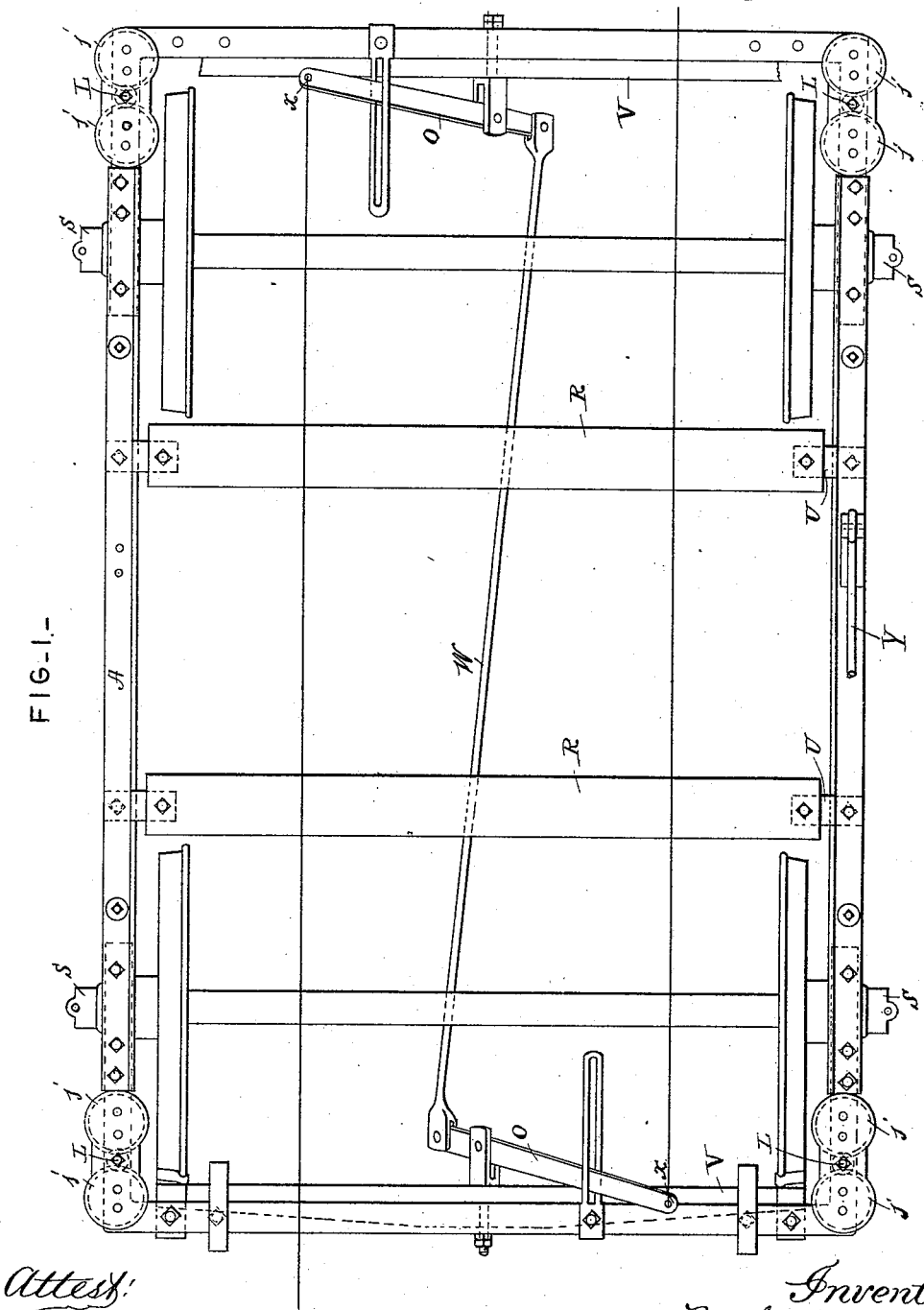
Figure 2:
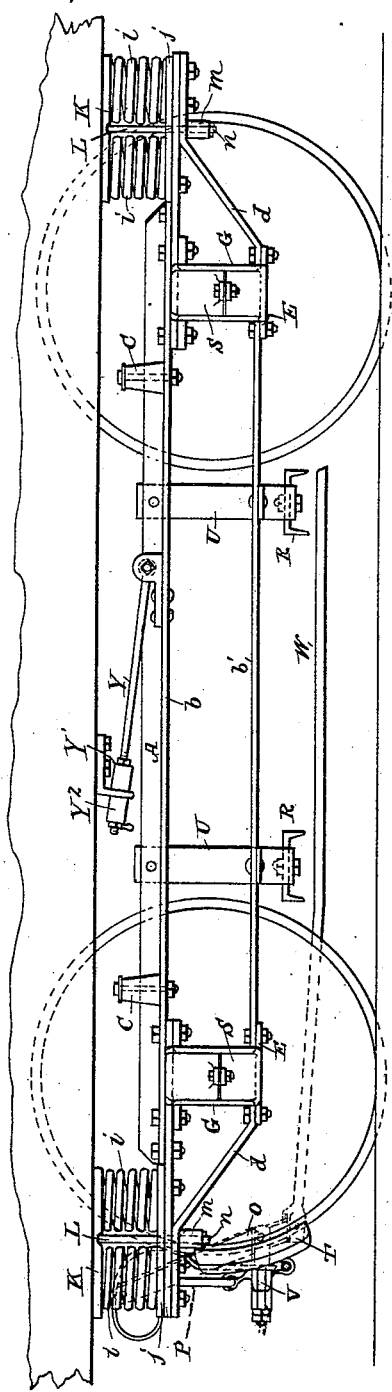
Figure 3:
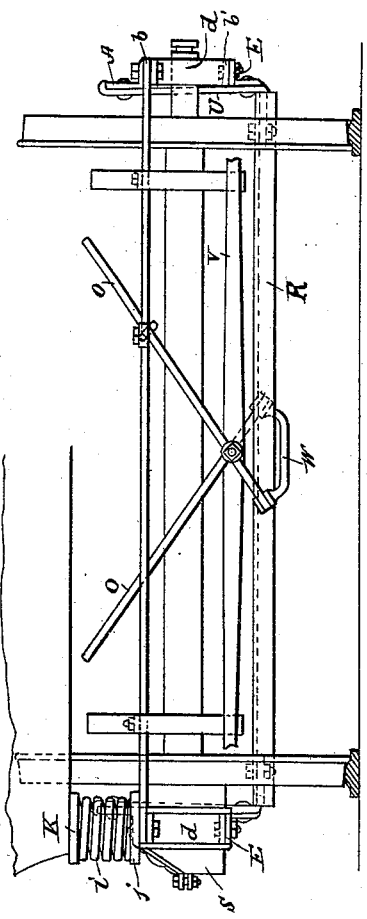
Figure 4:
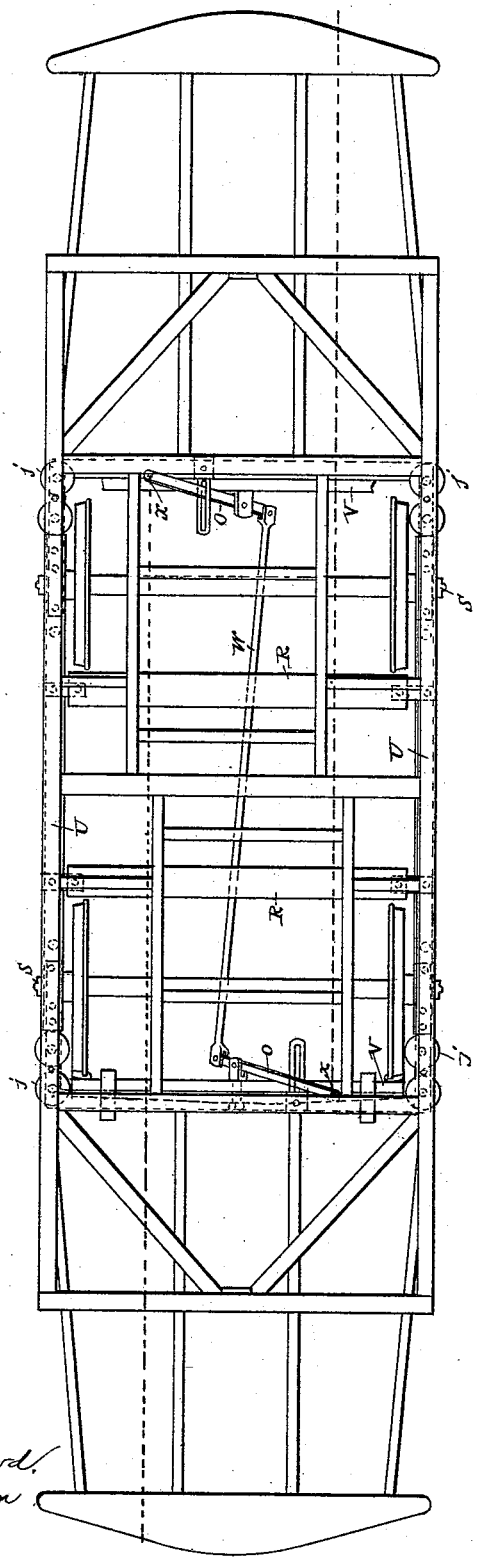
Figures 5, 6:
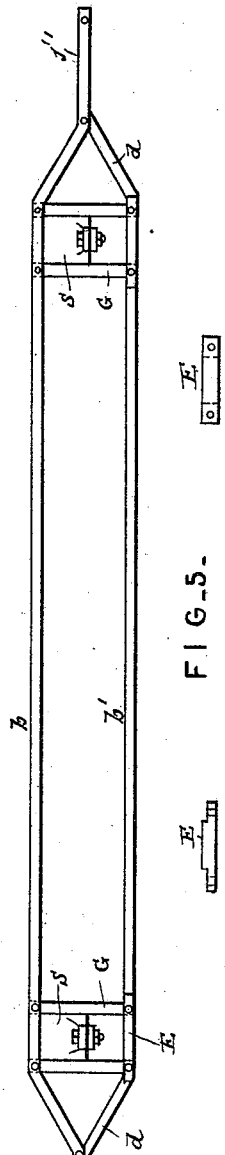

Figure 1 is a plan view of the truck or gear. Fig. 2 is a side elevation thereof. Fig. 3 is an end view thereof. Fig. 4 represents a floor-frame of a long car-body mounted on my improved truck or gear and having an opening for giving convenient access to the machinery. Fig. 5 is a detached view of the shouldered cross-piece. Fig. 6 is a side elevation showing a modification of a part of my invention for mounting horse-cars and trailing cars.

My invention is particularly applicable to electric cars where it is desired to apply the power to all of the wheels, and therefore the car should be mounted on two axles. It is desirable to construct such cars longer than ordinary street-cars and to prevent any excessive longitudinal rocking of the car-body and to curve around street-corners with as little resistance as possible. To accomplish these objects I construct my car-body about twenty-two feet long and make my wheel-base about six feet and my spring-base about nine feet, the wheel-pieces A A being extended outside of the journal-boxes S S sufficiently for that purpose and the car-springs mounted on the ends thereof. To do this cheaply and conveniently, I construct the wheel-pieces A A of two bars of iron or steel $b$ and $b'$, Fig. 2. One of these bars should be of angle-iron and the other may be of ordinary flat iron, as shown. The upper bar $b$ may be extended entirely around the truck or gear, as shown in Fig. 1, to give rigidity to the parts and a proper attachment of the brakes thereof to relieve the springs and body of the car from the vertical action of the brakes. The lower bar $b'$ should terminate at its attachments to form one side of the skeleton pedestals G G and short cross-pieces E E, bolted across the opening to the braces $d\ d$, for convenience in removing the journal-boxes, axles, and wheels. In the detached view, Fig. 5, the abutting shoulders formed upon these cross-pieces fit in between the ends of the braces $d\ d$ and the ends of the lower bar $b'$, to form a continuous brace from one end of the wheel-piece to the other to support the springs and the load. The braces $d\ d$ extend up and support the spring-beds $j\ j$, on which the springs $i\ i$ rest, which support the car-body. The upper ends of the springs are held in place by the spring-caps K K, Fig. 2, which are held in position vertically by the loose check rods or links L L, which pass through holes somewhat larger than the rods and down between the springs and through the spring-beds and check-springs $m\ m$ and have the check-keys $n\ n$ through their lower ends. These loose check rods or links I prefer to hook into eyes cast on the under side of the spring-caps, and passing down loosely through the spring-beds connect the check or recoiling springs $m\ m$ with the car-body and hold it down upon the car-springs, thereby limiting its upward movements and preventing any rattling or noise from the car-springs. It thus forms what I term an "elastic check-link." The elastic concussion-seats C C serve to protect the extended wheel-pieces from any excessive strains, as they are adapted to check the downward movement of the car and sustain over or near the journal-box any excess of load. These concussion-seats may be located over the journal-boxes or near them, and may be made of rubber or of low stiff coil-springs.

The brakes T T are attached to the extensions of the wheel-pieces by ordinary brake-hangers at P and are worked by the brake-levers O O, which are pivoted to the brake-beams $v\ v$, Fig. 1. It is important to incline these brake-levers laterally in opposite directions, as shown in Fig. 3, in order to locate the brake-rods $x\ x$ on the sides of the opening in the car-floor, and by extending each brake-rod to the end of the car and connecting it to the ordinary brake-wheel each brake-lever becomes an equalizing-lever for the other, and the brakes are worked equally from either end of the car. These brake-levers may be so inclined laterally as to extend the brake-rods directly from them to the brake-wheel shafts on a line outside of the opening through the car-floor, and when thus arranged and the lower ends of the brake-levers connected by the slanted or horizontally-inclined brake-connecting rod W, extending from one brake-lever to the other under the cross-bars R R, all of the parts are conveniently out of the way and operate in nearly direct lines. The brakes being attached independently of the car-body do not affect it by their vertical action, nor do they interfere with the free action of the springs, which are adapted to carry the car-body without auxiliary lateral supports of any kind, and any excessive longitudinal strain is prevented by pivoting the car-body directly to the truck by the draft-links Y Y, which I construct in such manner as to be elastic in both directions by locating a small stiff spring each side of the bracket or ear to which they are attached, as shown at $Y'\ Y^2$. This imparts to the car-body an unusual steadiness and freedom from jars and vibrations in all directions and great strength to resist violent concussions.

The cross-bars R R serve to support the motors in the ordinary manner; but it will be observed that by the free action of the springs upon which the car-body is mounted the motors will be entirely free from the lateral as well as the vertical movements of the car-body, and being journaled to the axles and resting upon the cross-bars both ends of the motors will always be acted upon alike by the lateral motions of the car-wheels, while the vertical motions of the wheels will be cushioned by small springs, upon which they rest in the ordinary manner.

The modification shown in Fig. 6 is adapted to ordinary horse-cars and trailing cars, and is a very strong, cheap, and convenient way of attaining for these cars some of the most valuable advantages of my invention. The wheel-piece in Fig. 6 being composed of the flat bars $b$ and $b'$, standing edgewise, give great vertical stiffness. The straight portion of the lower bar is bent at right angles at its ends, and is firmly attached to the upper bar, as shown, and thereby forms the inner sides of the skeleton pedestals for inclosing the journal-boxes S S in a similar manner to the arrangement shown in Fig. 2. The braces $d\ d$ are attached to the upper bar in a similar manner, except that they stand edgewise, and are firmly secured at their outer ends to the upper bar and to vertical flanges cast on the under sides of the malleable-iron spring-beds $j\ j$, Fig. 6, the upper bar and the braces and the said flanges being all bolted or riveted together. The cross-pieces E E, Fig. 6, being bolted to the lower ends of the braces and to the lower bar $b'$ and having shoulders which fit between the ends of the braces and the ends of the lower bar $b'$ form a continuous brace from one end of the wheel-piece to the other without relying wholly upon the bolts by which it is secured, and it also thus holds the journal-box in position.

On the sides and top and bottom of the journal-boxes (see Figs. 2 and 6) I form suitable ribs to embrace the bars forming the skeleton pedestals to hold them securely in position, and I mount the springs and brakes and the car-body, as shown in Fig. 2. The downward bends or drooping of the extensions of these wheel-pieces are for the purpose of setting the car-body lower for horse-cars or trailing cars, while in the arrangement shown in Fig. 2 the extensions are carried out straight, in order to locate the car-body high enough to clear the electric machinery.

I am aware that to attain a greater wheel-base others have made long trucks, nearly as long as the car-body; but to do so they had to mount the truck on wheels, all of which were independent in order to curve around street-corners, which required divided axles and double the number of journals and journal-boxes, besides being impracticable in other respects.

My object in the above-described invention has been to make as short a truck as possible and to enable me to use the ordinary standard axle and wheels as being much preferable to independent wheels in many respects; but my rigidly-attached pair of wheels to each one of my two axles require the shortest possible wheel-base to enable them to curve around street-corners, and hence my truck must be short, and to attain the stability of a long car-body on a short truck I increase my spring-base by locating my springs upon the extended ends of the wheel-pieces of the truck-frame, which extends considerably beyond the axle journal-boxes and entirely around the wheels.

I am also aware that efforts have been made to accomplish some of the objects of my invention by employing two long side bars having no lateral connection with each other, but having their ends rigidly connected to the car-body laterally. In my above-described plan the complete truck-frame is made as short as possible to conform to the requirements of the standard and approved style of street-car axles and wheels, which require a short wheel-base for curving; but by locating my springs out on the ends of this short truck-frame I get a sufficiently long spring-base to carry my car steadily and easily. I am thus enabled to combine the desired long car-body and sufficiently long spring-base with a short truck and wheel-base and the standard axles and wheels, and thereby produce a car admirably adapted to the purpose enumerated and at greatly reduced cost as compared with other constructions.

Having now described my invention, I claim as new—

1. In a four-wheeled car, the combination of the car-body, the wheels, and the wheel-pieces, with the springs located outside of the wheel-centers, and the brakes having their attachment directly to the ends of the extended wheel-pieces and independent of the car-body, whereby the car is adapted to curve easily, the car-body is carried steadily, and is free from the vertical action of the brakes, substantially as set forth.

2. The wheel-pieces composed of the upper and lower metallic bars and their separate extensions or braces bolted thereto, in combination with the cross-bars connecting them and the movable pieces by which the lower ends of the skeleton pedestal are connected, whereby the wheel-pieces are held together, a continuous lower bar is formed, and the journal-boxes may be conveniently removed, substantially as described.

3. The combination of the springs, the journal-boxes, the rigid connecting-bars, and the draft-links, substantially as and for the purposes set forth.

4. The car-body pivoted to the truck-frame by the draft-links, substantially as and for the purposes described.

5. The combination of the springs, the extended truck or gear frame, and the journal-boxes, with the draft-links located between the journal-boxes, substantially as and for the purposes specified.

6. In the extended wheel-piece, the combination of the upper bars extending entirely across the journal-boxes and the lower bar bent at right angles and bolted to the other, with the braces bent at right angles and bolted thereto, whereby the skeleton pedestal is open at its lower end and closed at its upper end by the said projecting upper bar and is formed to embrace the journal-box and permit the convenient removal thereof, substantially as set forth.

7. The skeleton pedestal, open at its lower end and closed at its upper end, formed in the extended wheel-piece by bending the lower bar and bolting it to the upper bar, in combination with the shouldered cross-piece adapted to hold the journal-box in position and for convenient removal, and also by its shoulders to form a continuous support from one end of the truck to the other, substantially as set forth.

8. A pivoted and elastic draft-link interposed between the car-body and its carrying-wheels and adapted to yield in either direction, substantially as and for the purpose described.

9. The car-body supported on upright springs on the truck, in combination with elastic and pivoted draft-links connecting the truck and car-body and permitting them to vibrate in all directions, substantially as described.

10. The two brake-levers pivoted to the transverse brake-beams and inclined laterally in opposite directions, in combination with brake-rods extending from the upper ends thereof at the sides of the central opening in the truck-frame, and the brake connection or pivoted rod directly connecting the lower ends of said levers, substantially as described.

11. The combination of the two laterally-inclined brake-levers and the brake-rods with the lower slanted or horizontally-inclined brake connection, whereby the two brake-levers are adapted to act as equalizing-levers for each other, substantially as specified.

12. The combination of the two laterally-inclined brake-levers, each of which is inclined in a direction opposite to the other and in such manner as to locate its brake-rod and brake-wheel on the right-hand end of each end of the car, and the slanted or horizontally-inclined brake-connecting rod under the cross-bars, substantially as and for the purposes described.

13. The elastic concussion-seats located over or near the journal-boxes, in combination with the springs located at the ends of the extended wheel-pieces at considerable distance from the journal-boxes, whereby the extensions of the wheel-pieces are relieved from any excessive vertical strain, substantially as set forth.

14. The check rods or links and the check-springs at their lower ends, in combination with car-springs located under the car-sills, for the purposes substantially as described.

15. The combination of the long car-body, the short truck having the springs at its ends, said springs being arranged to support the body laterally without the aid of posts, pedestals, or side supports, and the pivoted and elastic draft-links, substantially as described.

16. The extended wheel-pieces, each composed of two metallic bars rigidly connected at their centers by vertical braces and arranged to rest upon and hold the intermediate journal-boxes and support the car-body on springs mounted upon their extended ends, said extended ends being connected laterally by cross-pieces in such manner as to form a strong and rigid rectangular truck-frame having a short wheel-base and a long spring-base, substantially as and for the purpose specified.

In testimony whereof I have hereunto set my hand.

MOSES G. HUBBARD.

Witnesses:
JULIUS H. P. GAUSS,
Mrs. R. HOWARD KELLY.